INVENTORS:
GEORGE T. F. CRESPIN
GRAHAM D. DAVIES
BY: *N N Kuntz*
THEIR ATTORNEY

INVENTORS:
GEORGE T. F. CRESPIN
GRAHAM D. DAVIES
BY: *[signature]*
THEIR ATTORNEY United States Patent Office 3,557,487
Patented Jan. 26, 1971

3,557,487
OCTANE RATING ANALYZER
George T. F. Crespin, Ellesmere Port, and Graham D. Davies, Chester, England, assignors to Shell Oil Company, New York, N.Y., a corporation of Delaware
Filed June 23, 1965, Ser. No. 466,220
Claims priority, application Great Britain, June 30, 1964, 27,040/64
Int. Cl. C101
U.S. Cl. 44—2
7 Claims

ABSTRACT OF THE DISCLOSURE

An octane analyzer for the automatic comparison of the octane number of a test fuel with the octane number of a reference fuel comprising a test engine and a fluid sample container for selectively supplying the engine with a quantity of either test fuel or a reference fuel under conditions of a continuously varying fuel-air ratio, the container having a diameter which increases upwardly gradually as a function of its height, then remains constant and thereafter decreases gradually. A detonation meter is provided for measuring the knock intensity of the engine and a peak detector is connected to the output of the detonation meter for detecting the peak value of the engine knock intensity. First and second memories are connected to the output of the peak detector and are capable of retaining the peak values of the knock intensity of the test fuel and of the reference fuel, respectively. A comparator is connected to the memories for comparing the stored peak values of the test and reference fuels and producing an output signal proportional to the difference between said stored peak values and switching means operatively engages the sample container, the memories, the peak detector and the comparator for automatically controlling the supply of the test and reference fuels to the container in a predetermined sequence and the storage of the said peak values in the respective memories.

---

The invention relates to an octane analyzer or apparatus for the automatic comparison of the octane number of a test fuel with the octane number of a reference fuel, as well as to an installation utilizing such an apparatus for the in-line blending of fuel components to a resultant blend showing an octane number which is at least substantially equal to a reference value.

Motor and aviation fuels are generally made up of a number of components in order to obtain a resultant blend fulfilling certain conditions, one of these conditions being the octane number of the fuel. One object of the present invention is to compare automatically the knock characteristics of fuels; a further object of the present invention is to control automatically the composition of fuel blends in such a way that the final product shows at least approximately a predetermined octane number.

It is known to measure the octane number of a fuel by means of an engine with a variable compression ratio (cf. the corresponding ASTM methods). The apparatus used in these methods is, however, not suitable for automatically controlling a fuel blending system.

It has been proposed to measure the dielectric constant of a fuel instead of its octane number and to use this magnitude for the control in question, taking into account that there exists a relationship between the dielectric constant of the fuel and its octane number. However, this relationship is not a very close one, nor is it unambiguous. In fact, the dielectric constant is only loosely related to the aromatic content of the fuel. Thus, automatically controlling the dosing of an anti-knock-dope, such as e.g. tetra-ethyl-lead (T.E.L.), tetra-methyl-lead (T.M.L.) or tetra-ethyl-methyl-lead (T.E.M.L.), in order to obtain a fuel with a predetermined octane number is not possible utilizing this method.

The present invention provides an apparatus which is capable of indicating continuously (although measuring in an intermittent manner) whether and to what extent a fuel to be tested deviates from a reference fuel in so far as its octane number is concerned, with the basis for this indication being a measurement which at least closely agrees with the known and almost universal procedure for the determination of the octane number (cf. the corresponding ASTM test methods). If this apparatus is applied in the manufacture or blending of the fuel from its components, automatic control of the resultant blend with respect to its desired anti-knock characteristics can easily be effected.

The apparatus according to the invention comprises a test engine provided with means for the temporary introduction of a flow of either the fuel to be tested (test fuel) or the reference fuel in a sequence determined by a switching unit under conditions of continuously varying air-fuel ratio; a detonation meter for measuring the knock intensity of the engine; an instrument (peak detector) capable of measuring peak values connected, if desired, via an amplifier and/or a transducer to the output of the detonation meter; a memory, connected to the peak detector, which is capable of retaining the peak values of the knock intensity of the test fuel and of the reference fuel; a comparator for comparing the stored values of the peak values of the test fuel and the reference fuel and producing an output signal dependent on the difference between the peak values; and, a switching unit for automatically switching the said fuel types on and off and for commanding the storage of the peak values in the memory.

The means for the introduction of fuel to the engine preferably comprise a sample container equipped with a level measuring or indicating instrument, the output of which is connected to the switching unit.

The engine used in the apparatus is usually a (single cylinder) engine of continuously variable compression ratio, though under certain circumstances other engines may be employed. The use of an engine with a variable compression ratio is not strictly necessary if, for example, the apparatus is destined for testing fuels in a relatively narrow range of octane numbers.

In order to determine the maximum knock intensity characteristic for a certain fuel (once the compression ratio of the engine is fixed), the fuel-air ratio has to be changed until the maximum value is attained. In the present apparatus the maximum value is automatically obtained by using the falling fuel level technique which leads to a continuously varying fuel-air ratio, starting with a relatively rich and ending with a relatively lean mixture. Somewhere in between, the engine will show the maximum knock intensity if the mean level of the fuel is properly adjusted.

It has now been found that the best results when using this technique can be obtained with a sample container wherein the diameter as a function of height is not constant, but shows a maximum value somewhere at middleheight. Preferably, the maximum diameter should correspond at least roughly to the point of maximum knock intensity; this can be achieved by adjusting the height of the container, i.e., by raising or lowering it.

The present apparatus is further equipped with an instrument that is capable of measuring the peak values of the detonation meter, i.e., a so-called peak-detector or peak-picking device. The peak values corresponding to the maximum knock intensity of the test fuel and of the reference fuel are passed on to a memory which stores these peak values. The said values are led to a comparator for comparison; the comparator gives off a signal which is dependent on, and usually proportional to the difference between the peak value of the test fuel on the one hand and the peak value of the reference fuel on the other hand.

Normally, the engine is fed alternately with the test fuel and the reference fuel, although a different sequence of feeding these fuels to the engine may be used, for example: firstly the reference fuel, then the test fuel a number of times (say three times), and then again the reference fuel, etc. The feeding of the engine, via the sample container, with the test fuel and the reference fuel is controlled by a switching unit which in the most often used sequence alternately switches the test fuel and the reference fuel into the sample container. Of course, there may be more than one sample container, for example, one for the test fuel and one for the reference fuel, the different containers then being alternately connected to the engine. Usually, however, only one container is applied which is alternately filled to a certain level (maximum level) with either type of fuel.

The apparatus according to the invention or octane analyzer may usefully be applied in an installation for blending fuel components to obtain a resultant blend with a prescribed octane number, especially in an installation for in-line blending. In an installation of the latter type no tank is necessary for blending, and the blend may be delivered as soon as it is manufactured from its components. A tank may be present, however, for storing the blend. The octane analyzer compares the octane number of the blend with that of a reference fuel having the prescribed octane number, and the output signal thereof is used for the control of at least one of the component streams, preferably, for the stream of an anti-knock-dope or a high octane number fluid.

The flow rates of the normally-liquid components of the ultimate fuel are generally controlled by means of a ratio-control mechanism, preferably, an electrical ratio controller such as the Electro-Rato system shown in U.S. Pat. No. 3,089,643, issued May 14, 1963. The vapor pressure (Reid vapor pressure) of the blend may be additionally controlled by adding a stream of normally gaseous or very volatile hydrocarbon components (e.g. butane or pentane). The amount added may be controlled by means of a vapor-pressure controller which compares the actual vapor pressure of the blend with a preset value for the said pressure. The normally gaseous components are usually added in liquid form.

The invention is further illustrated with reference to the drawing wherein.

Figure 1:
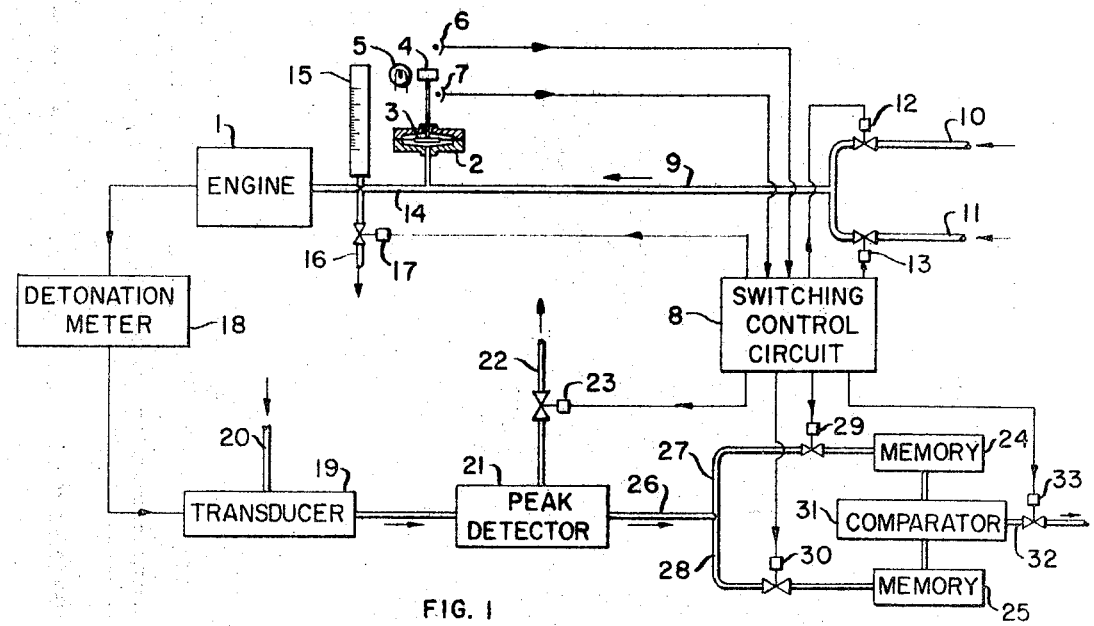
FIG. 1 is a schematic diagram of a particular embodiment of an octane analyzer according to the invention.

Referring now to FIG. 1, there is shown a conventional knock test engine 1, i.e., a single cylinder engine with a selectively variable compression ratio, which receives its fuel from a sample container 2 equipped with a level measuring instrument. The level measuring instrument consists, for example, of a float disc 3 having mounted thereon a vane 4 which selectively actuates a pair of photo-transistors or photocells 6 and 7, for example, by blocking out the light from a light source 5. The output signals from the photocells 6 and 7, which are indicative of the height of the liquid in the container 2, are transmitted to a switching unit 8.

The sample container is filled with fuel through a flow line 9 which is connected to a flow line 10 for the introduction of the test fuel and to a flow line 11 for the introduction of the reference fuel. In the latter lines there are valves 12 and 13, respectively, actuated by the switching unit 8. The sample container 2 is connected to the engine via a flow line 14 through which the fuel from the container flows to the jet of the carburetor on the engine 1. The flow line 14 is equipped with a sight glass 15 and a drain 16 provided with a valve 17 which is also actuated by the switching unit 8.

Figure 2:
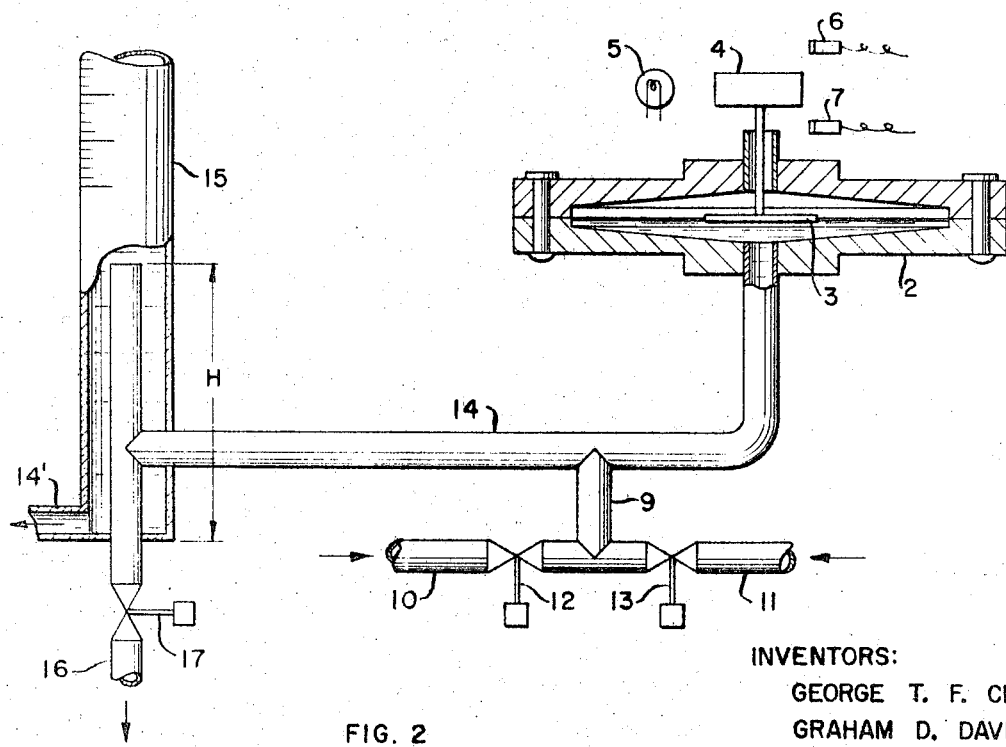
FIG. 2 is an enlarged elevation, partially in section, of a preferred embodiment of the fuel handling arrangement for the test engine.

Although a container of regular cross section may be used for the fuel container 2, a preferred embodiment of the fuel container is shown in FIG. 2. As shown in the figure the diameter of the fuel container 2 varies as a function of height, first increasing gradually, then remaining constant for a short length and finally gradually decreasing. As the level of fuel in the container continually decreases, the fuel-air ratio continuously changes and eventually passes through a value at which the knock intensity reaches a maximum. The height of the container 2 relative to the engine 1 is preferably adjusted so that the maximum knock intensity occurs during the period when the falling level of the fuel in the container is at the portion where the diameter of the container is constant. This allows for greater ease and accuracy in detecting and measuring the maximum knock intensity.

The fuel container 2 is connected to a small reservoir vessel, e.g. the sight glass 15, via a flow line 14 which debouches into the reservoir vessel at a point situated at a height H above the bottom. At the bottom, the vessel 13 is connected through a line 14′ with the fuel input of the engine 1. Flow line 14 is also connected to the controllable drain system 16–17. The connecting lines are kept as short as is feasible.

When switching fuels after the recording of a peak, the drain valve 17 is opened for a period of approximately 5 seconds to drain the fuel from the entire feed system and from the reservoir vessel 15 to the height H. The height H is adjustable and is determined by the small amount of fuel left in the reservoir vessel 15 and line 14′ which is necessary to keep the engine 1 firing during the period in which the drain valve 17 is open.

Connected to the engine 1 is a detonation meter 18 for the measurement of the knock intensity of the engine. The detonation meter and the engine may be the same as those used in the determination of the octane number according to one of the well-known ASTM methods.

The electrical signal from the detonation meter is fed to a transducer 19, which translates the electrical signal (0–5 ma.) into a pneumatic signal (3–15 p.s.i.g.), instrument air being introduced via a line 20. The thus obtained pneumatic signal is fed to a peak-detecting instrument 21 which, for example, may comprise a relay which seals in a pressure equal to the maximum pressure (peak-height pressure) received. The peak detector 21 is equipped with a vent 22 controlled by a control valve 23 actuated by the switching unit 8.

The peak values from the detector are selectively stored in a pair of memories 24 and 25, of which 24 stores the peak value corresponding to the reference fuel and 25 stores the peak value corresponding to the test fuel. For that purpose a line 26 from the output of the peak detector 21 is connected to two lines 27 and 28, respectively, the first of which leads to memory 24 and the second to memory 25. Line 27 is controlled by a control valve 29 and line 28 by a control valve 30. Control valves 29 and 30 are actuated by the switching unit 8. Both memories are connected to a comparator device 31 such as a computing relay, which transmits an air signal in the range of 3–15 between the input signals originating from the two memories 24 and 25. In the ideal case where the peak heights of test fuel and reference fuel are the same, the computing relay will transmit an output pressure of about 9 p.s.i.g. Test fuel peaks higher and lower than reference fuel peaks produce output signals in the ranges of 9-15 p.s.i.g. and 3-9 p.s.i.g., respectively (or vice versa, if so required).

The output signal of the comparator 31 may be led via a line 32, equipped with a control valve 33, to a controller, as will be described later on. The control valve 33 is also actuated by the switching unit 8.

The preferred manner of fuel switching is such that the sample container is alternately filled with test fuel and reference fuel, and this filling sequence is continually repeated. The fuel switching is synchronized with the appropriate valves (preferably electromagnetic air valves) 12, 13, 17, 23, 29, 30 and 33, in order that comparator 31 may compare the signals due to the reference fuel peak with the signal due to test fuel peak.

Figure 3:
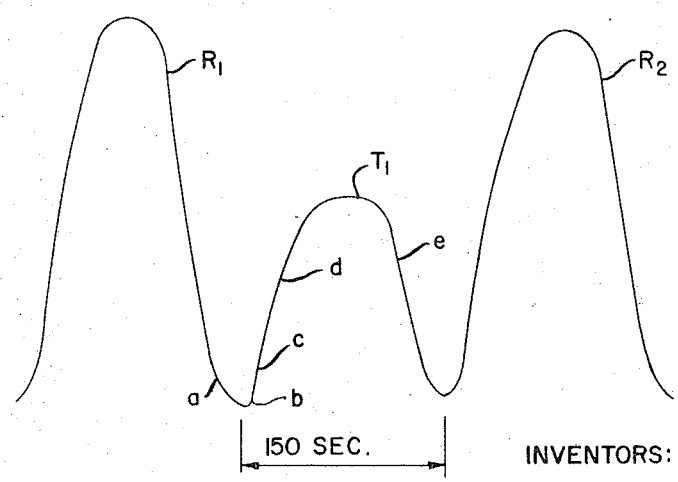
FIG. 3 is a curve illustrating the operation of the octane analyzer according to the invention.

In practice one "peak" measurement is carried out in about 2½ minutes. The value of this time interval, however, is not critical, and the interval chosen may be either longer or shorter than 2½ min. Thus, new control pressure signals will be transmitted at 2½ min. intervals. The operation of the several valves by the switching unit 8 is illustrated by the following table and the curve shown in FIG. 3 which illustrates the states $a$–$e$ mentioned in the table and may be obtained by recording, for example, the output signal from the detonation meter 18. $R_1$ and $R_2$ refer to reference fuel peaks and $T_1$ to a test fuel peak, and it is assumed here that the reference and the test fuel have different octane ratings.

In the table it is assumed that the engine had just completed a run on the reference fuel and that the level of the fuel in the sample container is causing the float-mounted vane 4 to pass the lower phototransistor 7. The signal corresponding to the reference fuel is at that moment stored in memory 24. The switching unit is then in state $a$ (see FIG. 3) at the start of a test fuel cycle.

Since the valves 13 and 29 are associated with the reference fuel system, they remain closed during the operation on the test fuel.

test and reference fuels and may be used for recording or controlling purposes.

In another embodiment of the present apparatus the measuring of the peak values of the detonation meter 18 is carried out in an electrical instead of a pneumatical way. The output signal of the detonation meter may thus be led directly to an electrical peak-detector device 21, the princ.pal part of which is formed by a condenser. The original pneumatic memories 29 and 25 are replaced by electrical memories, e.g., condensers, and relays, e.g., reed switches, are substituted for valves 23, 29 and 30. The peak values from peak detector 21 are passed via the corresponding relays to memories 24 and 25, respectively, which when they constitute condensers are coupled to high impedance amplifiers, which may, for example, be operational amplifiers. The output signals of these amplifiers are then compared in the comparator 31, which may consist of an electrical resistance network. The electrical output signal from the comparator device may then similarly be used for recording or it may be passed on to an electrical controller or via a transducer to a pneumatic controller.

Usually the output signal from the present apparatus is employed for controlling the blending installation in which the test fuel is manufactured in such a way as to produce a blend which has an octane rating at least substantially equal to the octane rating of the reference fuel. An example of such a blending installation is schematically shown in FIG. 4.

Figure 4:
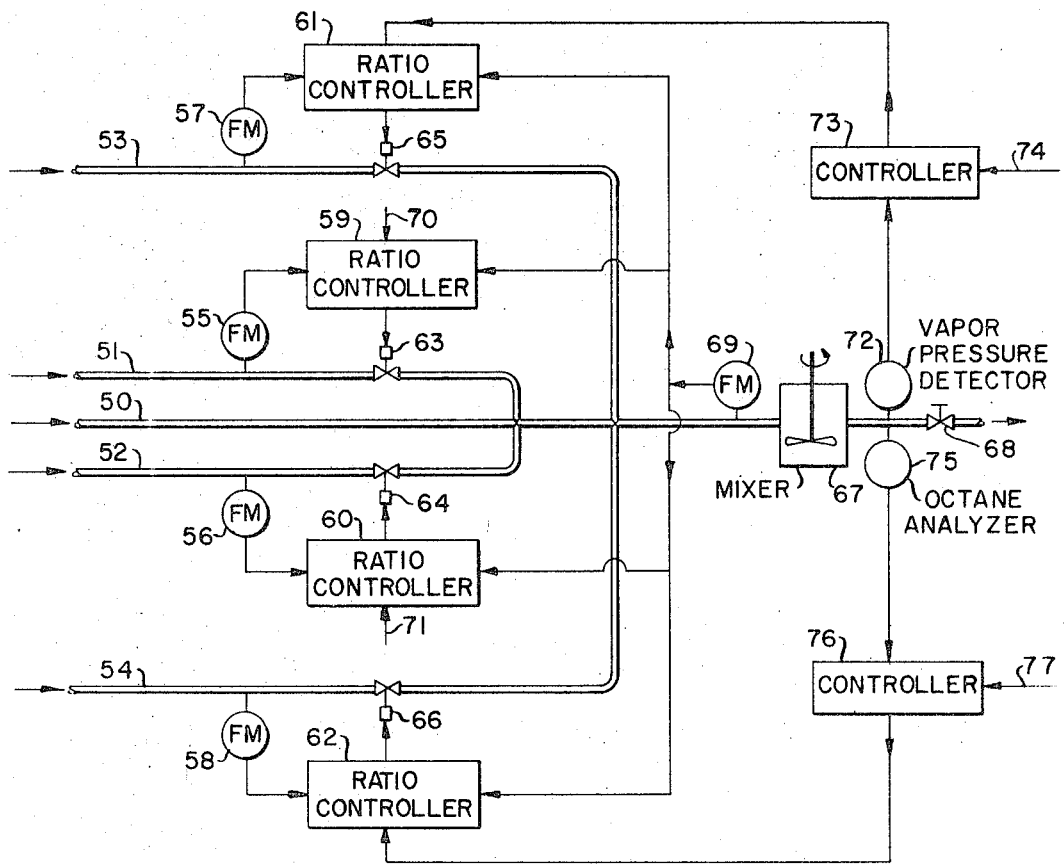
FIG. 4 is a schematic diagram of an in-line blending installation utilizing an octane analyzer according to the invention.

For purposes of the blending system of FIG. 4, it is assumed that a motor gasoline with a given octane number is to be blended from a light gasoline fraction, a nahptha and a platformate as basic components. Butane is also added to satisfy vapor pressure demands on the blend, and tetra-ethyl-lead is admixed to give the finished gasoline the octane number required. The control of the amounts of the several components mentioned is carried

TABLE

[Valve switching sequence after storage of a reference peak. An open valve is indicated by "O," a closed valve by "X."]

| State | Time, sec. | Valve number | | | | | | | Action |
|---|---|---|---|---|---|---|---|---|---|
| | | 12 | 13 | 17 | 23 | 29 | 30 | 33 | |
| a | 0 | X | X | O | O | X | O | X | Drain valve 17 open; peak detector vented; memory 25 ready to store next peak. |
| b | 5 | O | X | X | O | X | O | X | Drain valve 17 closed; sample container 2 filled with test fuel. |
| c | 8 | X | X | X | O | X | O | X | Top photo-transistor 6 obscured by vane 4; test fuel valve 12 closed. |
| d | 45 | X | X | X | X | X | O | X | Vent 20 of peak detector 23 closed. |
| e | 105 | X | X | X | X | X | X | O | Test fuel peak has been stored and is now compared with stored reference fuel peak; the output pressure signal of comparator 31 passed on to a controller. |

The sequence is similarly repeated for the next sample, which is, however, recognized by the switching unit 8 as a reference fuel. Consequently, valves 12 and 30 remain closed during the next cycle and valves 13 and 29 operate as indicated in the table for valves 12 and 30, respectively.

Each reference fuel peak is compared in the comparator 31 with both the preceding and the following test fuel peaks, hence there is no break in the 2½ min. control pressure frequency. If there are more test fuel cycles between two reference fuel cycles, the system operates in a similar way.

In an ideal case the reference and the test fuel will have the same octane rating and thus show the same peak heights; the pressure difference will therefore be zero. The comparator 31 is usually biased in such a way that under these conditions it transmits an output pressure of 9 p.s.i.g. The output signal from the comparator 31 is a measure of any difference in octane rating between the out according to the invention and will be explained hereinafter. It may, however, be remarked that the method and the installation according to the invention do not depend on the specific components applied in the example given. Other basic components could have been chosen, and more or fewer components could have been applied than in the example. For example, instead of T.E.L., T.M.L., T.E.M.L. or a high octane number fluid could be used; and the vapor pressure could be controlled by adding a fluid other than butane.

In FIG. 4 five flow lines 50, 51, 52, 53, and 54 are shown for the introduction of several components: naphtha, light gasoline fraction, platformate, butane and T.E.L., respectively.

The flow rates in the latter four flow lines are measured respectively by flow meters 55, 56, 57 and 58, whose output signals are fed to ratio-controllers 59, 60, 61 and 62, respectively.

The flow rates in lines 51, 52, 53 and 54 are controlled by means of valves 63, 64, 65 and 66, respectively.

The several components flowing in flow lines 51–54 are introduced into the flow line 50 where they are all blended together. If desired they may be further mixed by means of a mixer 67. The finished blend passes through a shut-off valve 68 and is then ready for immediate delivery; thus avoiding the use of mixing tanks, though, as far as the invention is concerned, such tanks could be employed.

The flow rate of the total blend stream is measured with a flow meter 69, which gives off a signal to each of the ratio controllers 59–62. Flow ratio controller 59 compares the flow rate in line 51 with the flow rate of the total blend and controls the valve 63 in such a way that the flow rate in line 51 assumes and keeps a predetermined ratio, or at least substantially so, with respect to the total flow rate. This predetermined ratio is set on the controller, e.g., by means of an adjustable set value input 70.

Controller 60 operates in a similar way with respect to the flow rate in line 52. The predetermined ratio is set on the controller by means of input 71.

Instead of feeding the ratio controllers with the (pulse-shaped) signal of flow meter 69, a pulse generator (not shown) may be used, giving off pulses to each of the ratio controllers. In this case, however, flow line 50 should also be equipped with the combination of a flow meter, a valve and a ratio controller. The flow rate of the total blend stream can then be changed by varying the pulse-frequency of the generator.

The vapor pressure is determined by means of an instrument 72. This instrument gives off an output signal to a controller 73 which compares the value of the vapor pressure actually measured with a preset value introduced at 74. The output signal of controller 73 is used to adjust the ratio value of ratio controller 61. Ratio controller 61 controls the amount of butane to be added through line 53 by means of valve 65 in such a way that the amount of butane flowing per unit of time through line 53 is kept equal to or at least substantially equal to a preset ratio with respect to the total amount of blend manufactured by the installation per unit of time. The value of this preset ratio is now controlled by the output signal from controller 61. In this way the actual vapor pressure (Reid vapor pressure) of the finished blend is made to equal the preset value 74 or at least substantially equal it.

The octane rating of the finished blend is determined by means of an octane analyzer 75 which is constructed according to the present invention and which has already been described with respect to FIG. 1. The finished blend is introduced into the octane analyzer 75 as the test fuel by any conventional sampling system, e.g. by connecting the flow line 10 (FIG. 1) to the flow line containing the finished blend.

The output signal from the comparator 31 (FIG. 1) of the octane analyzer is fed to a controlled 76 which usually has the set point of its input 77 adjusted to zero. The output signal of controller 76 is used to adjust the ratio value of ratio controller 62. If desired, the controller 76 may be left out of circuit and the output signal of the octane analyzer 75 directly applied to ratio controller 62.

The controller 62 controls the flow rate of T.E.L. to be added to the gasoline mixture through control valve 66 in such a way that the ratio of the T.E.L. flow rate with respect to the flow rate of the blend produced is kept equal to or at least substantially equal to the ratio set on this controller. The ratio set on the controller 62 is now made dependent on the actual octane rating of the finished blend and the octane rating of the reference fuel in such a way that ultimately the amount of T.E.L. added is sufficient to give the finished blend the required octane rating. If the preset value of 77 is zero, the required octane rating equals that of the reference fuel.

In a simplified embodiment of the blending installation the ratio controllers 62 and/or 61 may be replaced by normal controllers and in a still further simplified scheme the output signals of the instruments 75 and/or 72 may directly act upon the valves 66 and 65, respectively.

We claim as our invention:

1. An octane analyzer for the automatic comparison of the octane number of a test fuel with the octane number of a reference fuel comprising:

a test engine;

a fluid sample container for selectively supplying said engine with a quantity of either test fuel or a reference fuel under conditions of a continuously varying fuel-air ratio, said container having a diameter which increases upwardly gradually as a function of its height, then remains constant and thereafter decreases gradually;

a detonation meter operatively engaging said engine for measuring the knock intensity of the engine;

a peak detector connected to the output of said detonation meter for detecting the peak value of the engine knock intensity;

first and second memories connected to the output of said peak detector and capable of retaining the peak values of the knock intensity of the test fuel and of reference fuel, respectively;

a comparator connected to said memories for comparing the stored peak values of the test and reference fuels and producing an output signal proportional to the difference between said stored peak values; and switching means operatively engaging the sample container, the peak detector, the memories and said comparator for automatically controlling the supply of said test and reference fuels to the container in a predetermined sequence and the storage of the said peak values in the respective memories.

2. The analyzer of claim 1 wherein the peak detector is connected to the output of the detonation meter through a transducer.

3. The analyzer of claim 1 wherein the fuel sample container has its lower end connected to the fuel input of said engine, said container being equipped with a level detecting instrument, the output of which is connected to said switching means to sequence the operation thereof when the level of fuel in said container reaches a predetermined level.

4. The analyzer of claim 3 wherein said fuel container is connected to said engine via a flow line which debouches into a reservoir vessel at a point above its bottom, the bottom of said reservoir vessel being connected to the fuel input of said engine; and a drain system controllable by said switching means connected to said flow line.

5. The analyzer of claim 1 including:

a mixing system coupled thereto for blending a plurality of differing fuel component streams, said mixing system including:

control means located in at least one of said component streams for varying the flow thereof, said control means having its input connected to the output of said comparator; and means coupled to said sample container for supplying a sample of the blend of fuel components to said container as the test fuel, whereby the octane member of the resultant blend is adjusted to an octane number substantially equal to that to the reference fuel supplied to said container.

6. The analyzer of claim 5 in which the control means is in the feed line of a high octane number fuel component.

7. The analyzer of claim 5 wherein at least one of said component streams is a normally gaseous hydrocarbon component, and including:

means included in said mixing system for measuring the vapor pressure of the blend of fuel component;

a controller included in said mixing system for comparing the value of the measured vapor pressure with a predetermined desired value of the vapor pressure and producing an output signal related to the difference; and means in said mixing system responsive to the output from said controller for varying the flow of said stream of hydrocarbon component.

References Cited
UNITED STATES PATENTS

| | | | |
|---|---|---|---|
| 3,208,273 | 9/1965 | Weber | 73—35 |
| 3,238,765 | 3/1966 | Beal | 73—35 |
| 3,312,102 | 4/1967 | Traver | 73—35 |
| 3,318,136 | 5/1967 | Payne et al. | 73—35 |

OTHER REFERENCES

"Data-Control-Special Purpose Computers in the Control of Continuous Processes," by Amber et al., from Automatic Control, vol. 7–8, May 1958, pp. 43–48.

"Automatic Blending Lives up to Goal," Petroleum Refiner, vol. 39, August 1960, pp. 97–100—Butler.

"Automation for Gas Blending," Oil and Gas Journal, vol. 58, No. 25, June 1960, pp. 108–111—Sisk.

DANIEL E. WYMAN, Primary Examiner

Y. H. SMITH, Assistant Examiner

U.S. Cl. X.R.

73—35